United States Patent [19]

Dove

[11] 4,215,918

[45] Aug. 5, 1980

[54] ELECTROCHROMIC DISPLAY DEVICE

[75] Inventor: Derek B. Dove, Mt. Kisco, N.Y.

[73] Assignee: Board of Regents, State of Florida, Tallahassee, Florida, for the use and benefit of the University of Florida, Gainesville, Fla.

[21] Appl. No.: 942,073

[22] Filed: Sep. 13, 1978

[51] Int. Cl.² ............................................. G02F 1/17
[52] U.S. Cl. .................................................. 350/357
[58] Field of Search ........................................ 350/357

[56] References Cited

U.S. PATENT DOCUMENTS 3,708,220  1/1973  Meyers et al. ..................... 350/357

*Primary Examiner*—James W. Davie
*Attorney, Agent, or Firm*—Arthur G. Yeager

[57] ABSTRACT

An improved electrochromic display device in which a thin, optically transparent, electrically conductive layer or film is applied to the electrochromic layer surface which is oriented toward the electrolyte.

5 Claims, 1 Drawing Figure

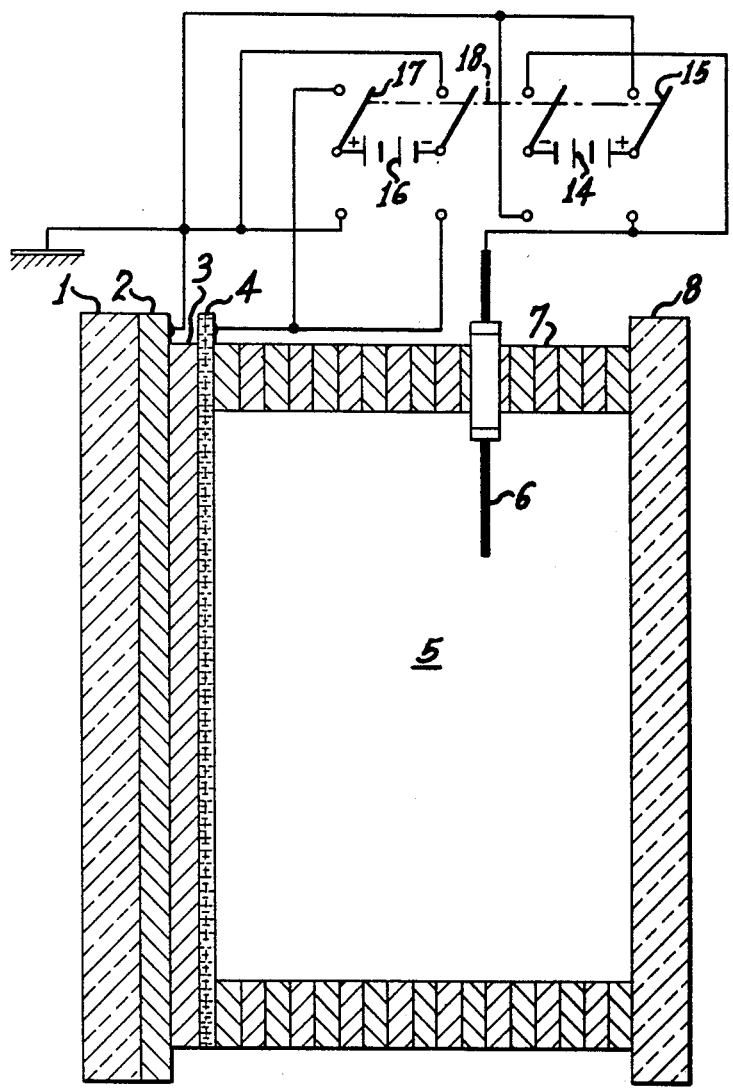

ELECTROCHROMIC DISPLAY DEVICE

BACKGROUND

The objects of this invention are to increase the speed with which the display of an electrochromic display device may be electrically altered and to increase the visual contrast that may be obtained in such a device for a given expenditure of electrical power.

Electrochromic cells are known which comprise a sandwich arrangement of a layer of tungsten oxide ($WO_3$) or other electrochromic material deposited on an electrically conducting substrate. The substrate serves as a first electrode, and it is usually, but not necessarily, optically transparent. The electrochromic layer is contacted by an electrolyte, which may be liquid, solid or semisolid. A second or counter electrode is in contact with the electrolyte. Such cells are, for example, disclosed in U.S. Pat. No. 3,708,220 to Meyers et al.

SUMMARY

According to the present invention a thin, optically transparent, electrically conducting film is disposed between the electrolyte and the juxtaposed surface of the electrochromic material layer, to which film a potential is applied, in addition to the potentials applied between the substrate and the counter electrode. By this means increased speed of coloration and of bleaching may be obtained, and the degree of coloration achieved for a given amount of electrical power dissipation is substantially increased.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

The sole FIGURE is a cross-sectional diagrammatic view of an electrochromic device according to the invention, including an external power supply connected thereto.

BRIEF DESCRIPTION OF THE PREFERRED EMBODIMENT

As shown in the drawing, a cell in accord with the invention comprises a sheet of glass 1 having a conductive, preferably transparent, tin oxide coating 2 thereon which serves as one electrode, and a layer 3 of electrochromic material, which may be tungsten oxide ($WO_3$), molybdenum oxide ($MoO_3$), or other electrochromic material, such as another one of those listed in the above Meyers et al patent, disposed against the tin oxide layer.

According to the invention, a thin, transparent, conductive, chemically non-reactive, film 4, such as a film of gold of a thickness, for example, of the order of $1 \times 10^{-6}$ inches is applied to the electrochromic material surface or which may be by vapor deposition, such as sputter deposition.

The film 4, in turn, is exposed to a quantity 5 of an electrolyte, which may be solid or liquid, or a gel, and which may be, for example, a sulphuric acid-polyvinyl alcohol gel as taught in the Meyers et al patent. A counter electrode 6 of conductive material unaffected by the electrolyte chemicals, and which is preferably of graphite or platinum, but which might be of indium, for example is placed in contact with the electrolyte, and the electrolyte is contained against the gold film by one or more gaskets or spacers 7 laterally surrounding the electrolyte and disposed between the gold layer and an oppositely disposed second glass plate 8. The spacers are of chemically resistant materials and may be a tetrafluoroethylene plastic of the type provided by E. I. Dupont & Co. under its trademark Teflon TFE.

An external power supply as indicated schematically in the drawing includes a battery 14 for providing, when double pole double throw switch 15 is in the lower position, a positive potential to the counter electrode 6 with respect to the grounded tin oxide layer 2, and also includes a battery 16 arranged with a second double pole double throw switch 17 to apply at the same time a negative potential to the gold film 4 with respect to the tin oxide, switches 15 and 17 being, as indicated at 18, mechanically linked.

Application of a positive 1.5 volt potential applied for 1.0 seconds from a battery 14 to an indium counter electrode 6 in a test cell such as described but without a gold film 4 resulted in a decrease in optical transmission of the $WO_3$ layer of 30 percent. An identical cell but with the thin gold film 4 at the $WO_3$-electrolyte interface provided the same reduction in optical transmission of the electrochromic material when the same 1.5 v. potential was applied to the indium electrode for 0.1 seconds and when an additional $-0.5$ v. potential with respect to the tin oxide was applied to the gold film from a battery 16. This degree of coloration was reached, moreover, with approximately one half of the current, or with about one-twentieth of the amount of electric power, required in the test cell without the gold film.

The electrochromic material may be bleached by reversing the potentials applied to the counter electrode and to the gold film or layer, such as by moving switches 15 and 17 into their upward closed positions.

For reasons not understood, it appears that gold as the material for films 4 provides superior functioning, as compared to films of aluminum or platinum, for example.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a variable light transmission device comprising a layer of a persistent electrochromic material, said material having its optical absorption alterable by addition or removal of electrons, a layer of electrolyte, said electrolyte and said electrochromic material being between a pair of electrodes, and means for connecting said electrodes to electric source means, the combination of a transparent conductive film interposed between and in contact with said electrolyte and said electrochromic material layers and spaced from said electrodes, and means for connecting said transparent conductive film to said electric source means.

2. The combination according to claim 1 wherein said film is of a noble metal.

3. The combination according to claim 1 wherein said film is of gold.

4. The combination according to claim 1 wherein said electrochromic layer is of tungsten oxide, said electrolyte layer is a sulphuric acid-polyvinyl alcohol gel, and said film is of gold.

5. The method of enhancing the response of a persistent electrochromic material layer to the application of voltages between a back electrode engaged with one face of such layer and a counter electrode in electrical contact in an electrolyte to which the opposite face of said layer is exposed which comprises applying a potential to a thin film of conductive material disposed at the interface between such electrochromic material layer and such electrolyte which is opposite in sign with respect to said back electrode to the potential applied to such counter electrode.

* * * * *